US012745788B2

(12) United States Patent
Shim et al.

(10) Patent No.: US 12,745,788 B2
(45) Date of Patent: Sep. 29, 2026

(54) METHOD FOR PREPARING LEGUMES POWDER USING AQUAFABA

(71) Applicant: Youn Young Shim, Seoul (KR)

(72) Inventors: Youn Young Shim, Seoul (KR); Martin J. T. Reaney, Seoul (KR); Yue He, Saskatoon (CA); Young Jun Kim, Seongnam-si (KR)

(73) Assignee: Youn Young Shim, Seoul (KR)

( * ) Notice: Subject to any disclaimer, the term of this patent is extended or adjusted under 35 U.S.C. 154(b) by 242 days.

(21) Appl. No.: 18/599,690

(22) Filed: Mar. 8, 2024

(65) Prior Publication Data

US 2024/0251830 A1 Aug. 1, 2024

Related U.S. Application Data

(63) Continuation of application No. PCT/KR2022/013653, filed on Sep. 13, 2022.

(30) Foreign Application Priority Data

Sep. 13, 2021 (KR) ........................ 10-2021-0122013

(51) Int. Cl.
*A23L 11/00* (2025.01)
*A23L 11/30* (2016.01)

(52) U.S. Cl.
CPC ............... *A23L 11/05* (2016.08); *A23L 11/30* (2016.08)

(58) Field of Classification Search
None
See application file for complete search history.

(56) References Cited

U.S. PATENT DOCUMENTS

2021/0059284 A1 3/2021 Reaney et al.

FOREIGN PATENT DOCUMENTS

| | | | |
|---|---|---|---|
| KR | 1020070003236 A | | 1/2007 |
| KR | 102276746 | * | 7/2021 |
| WO | 2021176454 A1 | | 9/2021 |

OTHER PUBLICATIONS

KR-OA1, First Office Action on Korean Application No. 10-2021-0122013 issued Jun. 7, 2022.

(Continued)

*Primary Examiner* — Lien T Tran
(74) *Attorney, Agent, or Firm* — Dinsmore & Shohl LLP; Yongsok Choi, Esq.

(57) ABSTRACT

Disclosed is a method for preparing legumes powder called aquafaba through a step of pre-soaking selected legumes or without the pre-soaking step, to produce vegetable proteins that can replace animal proteins. The method for preparing legumes powder includes selecting legumes; washing the selected legumes with distilled water, and then drying same at room temperature, i.e., 22° C.; pre-soaking the legumes in distilled water at 4° C. for 16 hours; separating the pre-soaked legumes and immersion liquid by using a sieve; cooking the separated legumes by heating at 118° C. in a pressed state by a pressure-heating apparatus; cooling the cooked legumes at 22° C. for 24 hours; separating the cooled legumes and immersion liquid (e.g., aquafaba (AQ)) produced after the cooling, by using a sieve; and freezing the separated immersion liquid (e.g., aquafaba (AQ)) at −20° C., followed by drying in a dryer, to obtain legumes powder.

2 Claims, 4 Drawing Sheets

(56) References Cited

OTHER PUBLICATIONS

KR-OA2, Second Office Action on Korean Application No. 10-2021-0122013 issued Nov. 22, 2022.
Notice of Rejection on Korean Application No. 10-2021-0122013 issued Mar. 28, 2023.

* cited by examiner

METHOD FOR PREPARING LEGUMES POWDER USING AQUAFABA

CROSS-REFERENCE TO RELATED APPLICATIONS

This application is a continuation of International Application No. PCT/KR2022/013653 filed on Sep. 13, 2022, which claims priority to Korean Patent Application No. 10-2021-0122013 filed on Sep. 13, 2021, the entire contents of which are herein incorporated by reference.

This research was supported by the Brain Pool Programs (2021H1D3A2A01099472 and RS-2023-00263163) through the National Research Foundation of Korea (NRF) funded by the Ministry of Science and ICT.

TECHNICAL FIELD

Various embodiments of the present invention relate to a method for preparing a legume powder known as aquafaba (for example, soaking liquid) for use in various dishes (for example, egg substitute dishes) using a by-product of legumes.

BACKGROUND ART

Recently, mass farming to obtain animal proteins has increased greenhouse gas emissions, which has led to problems of accelerating global warming and environmental pollution. Currently, among alternative foods that mimic animal proteins, vegetable proteins using legumes (for example, chickpeas and soybeans) are in demand.

These legumes contain the most protein and contain a lot of fiber, which is essential for controlling blood sugar and cholesterol levels.

However, conventional vegetable proteins were primarily utilized in the production of fermented products such as soy sauce and soybean paste. These proteins, derived from legumes, were unsuitable for creating animal protein alternatives, such as plant-based meat, cultured meat, or artificial eggs. This posed a significant challenge, especially considering the high demand for vegetable proteins among vegetarians and individuals with allergies to animal proteins.

A related document related to the present invention is Korean Patent Publication No. 10-2007-0003236 (published on Jan. 5, 2007), which discloses a technology for "a method of preparing pureed soybean stew."

SUMMARY OF THE INVENTION

Technical Problem

In various embodiments of the present invention, provided is a method for preparing a legume powder called aquafaba (for example, soaking liquid or legume cooking water, aquafaba, AQ), which is used in various dishes (for example, an egg substitute). The process includes pre-soaking or pre-soaking non-treatment of the legumes (for example, chickpeas, yellow soybeans, large black soybeans, and small black soybeans).

The technical problems overcome by various embodiments of the present invention are not limited to the above technical problems, and there may be other technical problems.

Technical Solution

According to various embodiments of the present invention, a method for preparing legumes powder may include:

a process of selecting legumes; a process of washing the selected legumes with distilled water and then drying the legumes at room temperature (RT, 22° C.); process of pre-soaking the legumes in distilled water at 4° C. for 16 hours; a process of separating the pre-soaked legumes and soaking liquid using a strainer; a process of cooking the separated legumes by heating the legumes at 118° C. while being pressurized by a pressurizing/heating device; a process of cooling the cooked legumes at 22° C. for 24 hours; a process of separating the cooled legumes and the soaking liquid (for example, aquafaba, AQ) generated after the cooling treatment using a strainer; and a process of freezing the separated soaking liquid (AQ) at −20° C. and drying it in a dryer for 48 hours to obtain legumes powder.

According to various embodiments of the present invention, the legumes may include chickpeas (*Cicer arietinum* (L.), ver. CDC Leader), yellow soybeans (*Glycine max* (L.) Merr., ver. Backtae), large black soybeans (*Glycine max* (L.) Merr., ver. Seoritae), and small black soybeans (*Rhynchosia* nulubilis, ver. Jwinunikong), and the legumes may include at least one of chickpeas, yellow soybeans, large black soybeans, and small black soybeans.

According to various embodiments of the present invention, in the process of pre-soaking the legumes in distilled water at 4° C. for 16 hours, the chickpeas may be placed in a first glass jar and sealed, the yellow soybeans may be placed in a second glass jar and sealed, the large black soybeans may be placed in a third glass jar and sealed, and the small black soybeans may be placed in a fourth glass jar and sealed.

According to various embodiments of the present invention, the chickpeas may be added along with distilled water at a 1:4 ratio (w/w) to the first glass jar, the chickpeas may be pre-soaked in distilled water at 4° C. for 16 hours, the yellow soybeans, large black soybeans, and small black soybeans may be added along with distilled water to the second, third, and fourth glass jars at a ratio of 1:3 (w/w), and the yellow soybeans, large black soybeans, and small black soybeans may be pre-soaked in the distilled water at 4° C. for 16 hours.

According to various embodiments of the present invention, in the process of separating the pre-soaked legumes and the soaking liquid, the distilled water may be added at a 1:1 ratio (w/w) to the first, second, third and fourth glass jars containing the separated legumes.

According to various embodiments of the present invention, in the process of cooking the separated legumes by heating the legumes at 118° C. while being pressurized by a pressurizing/heating device, the chickpeas may be cooked by heating for 30 minutes while being pressurized to 70 to 80 kPa by the pressurizing/heating device, and the yellow soybeans, large black soybeans, and small black soybeans may be cooked by heating for 90 minutes while being pressurized to 70 to 80 kPa by the pressurizing/heating device.

According to various embodiments of the present invention, a method for preparing legumes powder may include: a process of selecting legumes; process of washing the selected legumes with distilled water and then drying the legumes at room temperature of 22° C.; a process of pre-soaking the legumes in distilled water; a process of separating the pre-soaked legumes and soaking liquid; a process of cooking the separated legumes by heating the legumes while being pressurized by a pressurizing/heating device; a process of cooling the cooked legumes; a process of separating the cooled legumes and the soaking liquid (for example, aquafaba, AQ) generated after the cooling treatment; and a process of obtaining legumes powder after drying the separated soaking liquid.

According to various embodiments of the present invention, a method for preparing legumes powder may include: a process of selecting legumes; process of washing the selected legumes with distilled water and then drying the legumes at room temperature of 22° C.; a process of cooking the dried legumes by heating the legumes at 118° C. while being pressurized by a pressurizing/heating device; a process of cooling the cooked legumes at 22° C. for 24 hours; a process of separating the cooled legumes and the soaking liquid (for example, aquafaba, AQ) generated after the cooling treatment using a strainer; and a process of obtaining legumes powder after drying the separated soaking liquid (for example, aquafaba, AQ) at −20° C.

According to various embodiments of the present invention, the legumes may include chickpeas, yellow soybeans, large black soybeans, and small black soybeans, and the legumes may include at least one of chickpeas, yellow soybeans, large black soybeans, and small black soybeans.

According to various embodiments of the present invention, in the process of washing the selected legumes with distilled water and then drying the legumes at room temperature of 22° C., the chickpeas may be placed in a first glass jar and sealed, the yellow soybeans may be placed in a second glass jar and sealed, the large black soybeans may be placed in a third glass jar and sealed, and the small black soybeans may be placed in a fourth glass jar and sealed.

According to various embodiments of the present invention, in the process of washing the selected legumes with distilled water and then drying the legumes at room temperature of 22° C., the distilled water may be added at a 1:1.5 (w/w) ratio to the first, second, third and fourth glass jars containing the separated legumes.

According to various embodiments of the present invention, the chickpeas may be cooked by heating for 90 minutes while being pressurized to 70 to 80 kPa by the pressurizing/heating device.

Likewise, the yellow soybeans, large black soybeans, and small black soybeans may be cooked by heating for 90 minutes while being pressurized to 70 to 80 kPa by the pressurizing/heating device.

According to various embodiments of the present invention, a method for preparing legumes powder may include: a process of selecting legumes; a process of washing the selected legumes with distilled water and then drying the legumes at room temperature; a process of cooking the dried legumes by heating the legumes while being pressurized by a pressurizing/heating device; a process of cooling the cooked legumes; a process of separating the cooled legumes and the soaking liquid (for example, aquafaba, AQ) generated after the cooling treatment; and a process of obtaining legumes powder after drying the separated soaking liquid (for example, aquafaba, AQ).

BENEFIT(S) OF THE INVENTION

According to various embodiments of the present invention, the present invention shows the possibility of applying the product to the preparation of vegan foods made from legumes as an egg substitute. The product of the present invention may be applied for producing oil emulsifiers by preparing legume powders called aquafaba (for example, soaking liquid) through processes that contain a pre-soaking treatment process (for example legumes selection, washing and drying, soaking, separating, cooking by pressurizing/heating, cooling, separating, and drying) or a pre-soaking non-treatment process (for example legumes selection, washing and drying, cooking by pressurizing/heating, cooling, separating, and drying) of legumes (for example, chickpeas, yellow soybeans, large black soybeans, small black soybeans, and the like). The aquafaba powder of legumes obtained through this process can be used to develop multipurpose food materials such as porridge, soups, stews, rice cakes, pancakes, mung-bean pancakes, noodles, cookies, bread, soybean paste, makjang, red pepper paste, and various sauces. In addition, it can be used as plant-based meat, cultured meat, and artificial eggs that can replace animal protein. Therefore, the vegetable legumes powder prepared in this way can also be used as a meat and egg substitute for vegetarians and users with allergies to animal proteins.

DETAILED DESCRIPTION

Figure 1:
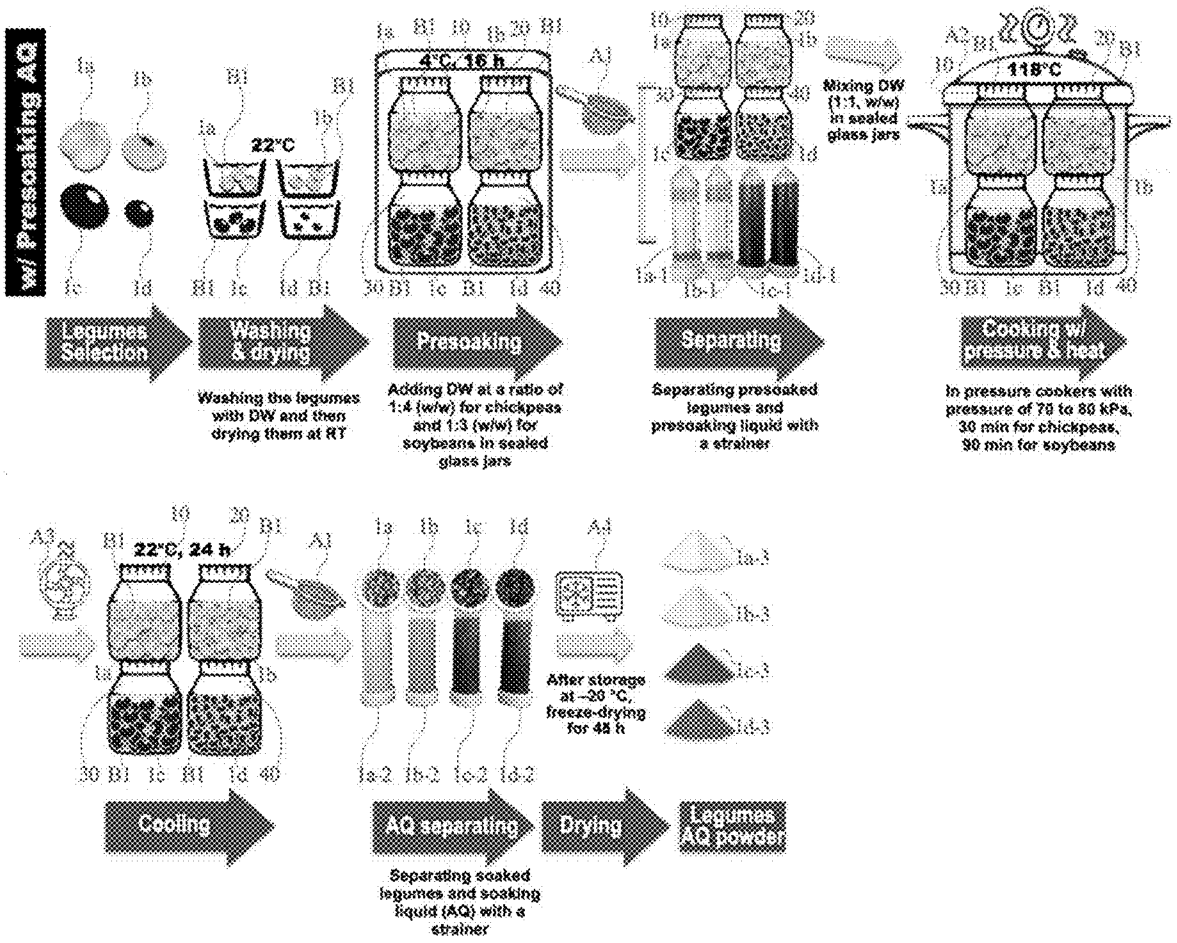
FIG. 1 is a drawing showing a pre-soaking treatment process in a method for preparing legumes powder known as aquafaba (for example, soaking liquid (AQ)) according to various embodiments of the present invention.

The present invention can be modified in various ways and can have several embodiments, and some embodiments will be described in detail with reference to the drawings. However, this is not intended to limit the present invention to specific embodiments, and it should be understood to include all modifications, equivalents and substitutes included in the spirit and scope of the present invention.

Terms including ordinal numbers, such as 'first,' 'second,' and the like, may be used to describe various components, but the components are not limited by the terms. The terms are used only for the purpose of distinguishing one component from another. For example, a first component may be named a second component, and similarly, the second component may also be named the first component without departing from the scope of the present invention. The term 'and/or' includes a combination of a plurality of related stated items or any of a plurality of related stated items.

In addition, relative terms described based on what is visible in the drawings, such as 'front,' 'rear,' 'top,' 'bottom,' and the like, can be replaced with ordinal numbers such as 'first,' 'second,' and the like. For ordinal numbers such as 'first,' 'second,' and the like, the order is the order mentioned or arbitrarily determined, and can be arbitrarily changed as needed.

The terms used in the present invention are only used to describe specific embodiments and are not intended to limit the present invention. Singular expressions include plural expressions unless the context clearly dictates otherwise. In the present invention, it is to be understood that the terms "include(s)" or "have (has)" and the like are intended to specify the presence of stated features, numbers, steps, operations, components, parts or combinations thereof, but do not preclude the presence or addition of one or more other features, numbers, steps, operations, components, parts and combinations thereof.

Unless defined otherwise, all terms used herein, including technical or scientific terms, have the same meaning as commonly understood by one of ordinary skill in the art to which this invention belongs. Terms such as those defined in commonly used dictionaries should be interpreted as having a meaning consistent with the meaning in the context of the related art and should not be interpreted in an ideal or excessively formal meaning unless explicitly defined in the present invention.

A method for preparing legumes powder using aquafaba (for example, soaking liquid (AQ)) according to various embodiments of the present invention may be a combination of one or more preparation methods of legumes soaking liquid (AQ) powder developed in various alternative foods, wherein by preparing legumes soaking liquid (AQ) powder through a pre-soaking treatment process or a pre-soaking non-treatment process of legumes (1), the legumes soaking liquid (AQ) powder obtained through this process may be used in various vegetable vegan dishes and may also be used as a variety of alternative foods such as plant-based meat, cultured meat, and artificial eggs that may replace animal protein.

The term "aquafaba (soaking liquid (AQ))" is a compound word of aqua (water)+*faba* (soybean), and refers to thick translucent liquid obtained by boiling legumes such as chickpeas in water. However, this cooking liquid is usually discarded after food preparation. Accordingly, the aquafaba may be formed into a stable edible foam with emulsifying ability with functional properties that may replace eggs in vegan cuisine, confectioneries and baking.

First, in an embodiment of the present invention, the process of preparing a legume powder through the pre-soaking treatment process of a method of preparing the legume soaking liquid (AQ) powder will be described as follows.

Figure 2:
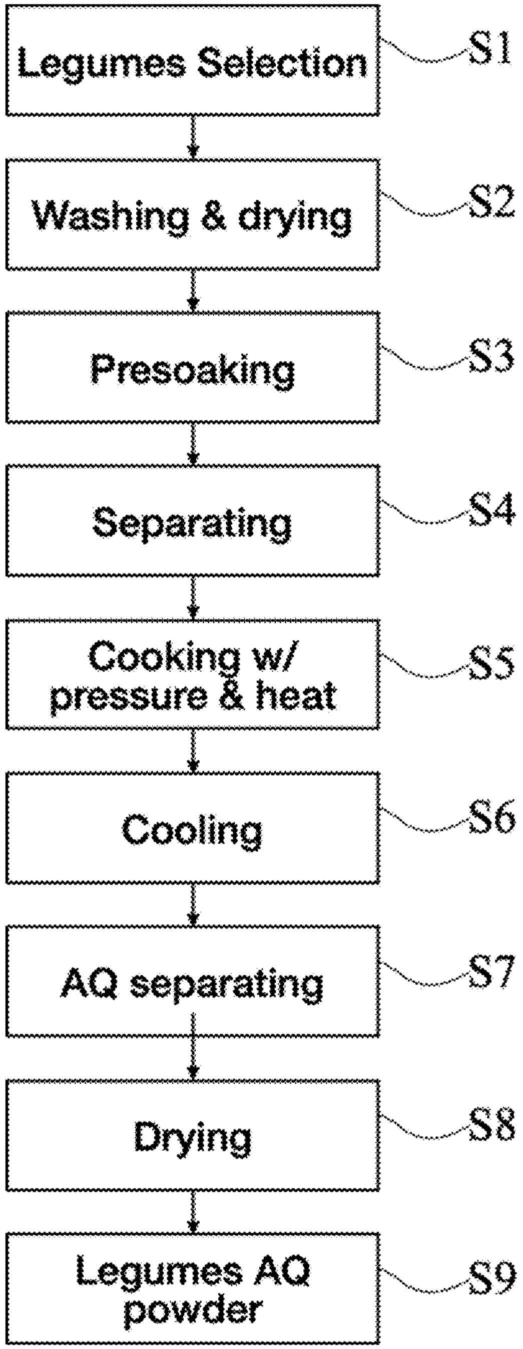
FIG. 2 is a flow chart showing a pre-soaking treatment process in a method for preparing legumes powder known as aquafaba (for example, soaking liquid (AQ)) according to various embodiments of the present invention.

FIG. 1 is a drawing showing a pre-soaking treatment process in a method for preparing legumes powder using aquafaba (for example, soaking liquid (AQ)) according to various embodiments of the present invention, and FIG. 2 is a flow chart showing a pre-soaking treatment process in a method for preparing legumes powder using aquafaba (for example, soaking liquid (AQ)) according to various embodiments of the present invention.

Referring to FIGS. 1 and 2, in the method of preparing legume soaking liquid (AQ) powder using aquafaba (for example, soaking liquid (AQ)), legumes (1) may be selected first. For example, the legumes (1) may include chickpeas (1*a*), yellow soybeans (1*b*), large black soybeans (1*c*), and small black soybeans (1*d*). In addition, the legumes (1) may include at least one of chickpeas (1*a*), yellow soybeans (1*b*), large black soybeans (1*c*), or small black soybeans (1*d*). Here, the chickpeas (1*a*) are foreign beans from Canada, and the yellow soybeans (1*b*), large black soybeans (1*c*), and small black soybeans (1*d*) are domestic beans.

In this embodiment, the legumes (1) will be described by selecting chickpeas (1*a*), yellow soybeans (1*b*), large black soybeans (1*c*), and small black soybeans (1*d*) (S1).

The legumes (1) include, for example, chickpeas (1*a*), yellow soybeans (1*b*), large black soybeans (1*c*), and small black soybeans (1*d*) but are not limited thereto. For example, the legumes may be applied in various ways as long as they are beans that may prepare legumes soaking liquid (AQ) powder.

The selected chickpeas (1*a*), yellow soybeans (1*b*), large black soybeans (1*c*), and small black soybeans (1*d*) may be washed with distilled water (B1) and then dried at room temperature of 22° C. (S2).

The chickpeas (1*a*), the yellow soybeans (1*b*), the large black soybeans (1*c*), and the small black soybeans (1*d*) may be pre-soaked in distilled water (B1) at 4° C. for 16 hours (S3). For example, the chickpeas (1*a*), the yellow soybeans (1*b*), the large black soybeans (1*c*), and the small black soybeans (1*d*) may be soaked in distilled water (B1) at 4° C. for 16 hours.

At this time, the chickpeas (1*a*) may be placed in a first glass jar (10) and sealed, and the yellow soybeans (1*b*) may be placed in a second glass jar (20) and sealed. In addition, the large black soybeans (1*c*) may be placed in a third glass jar (30) and sealed, and the small black soybeans (1*d*) may be placed in a fourth glass jar (40) and sealed.

At this time, the chickpeas (1*a*) and distilled water (B1) may be contained in the first glass jar (10) at a 1:4 ratio. In this state, the chickpeas (1*a*) may be pre-soaked in the distilled water (B1) at 4° C. for 16 hours (S3).

The yellow soybeans (1*b*), the large black soybeans (1*c*) and the small black soybeans (1*d*) and distilled water (B1) may be contained in each of the second, third and fourth glass jars (20, 30, and 40) at a ratio of 1:3. In this state, the yellow soybeans (1*b*), the large black soybeans (1*c*), and the small black soybeans (1*d*) may be pre-soaked in the distilled water (B1) at 4° C. for 16 hours (S3).

In addition, the soaked chickpeas (1*a*), yellow soybeans (1*b*), large black soybeans (1*c*) and small black soybeans (1*d*), and soaking liquids (1*a*-1, 1*b*-1, 1*c*-1 and 1*d*-1) may be separated using a strainer (A1) (S4).

Distilled water (B1) may be added to the first, second, third, and fourth glass jars (10, 20, 30, and 40) containing the chickpeas (1*a*), the yellow soybeans (1*b*), the large black soybeans (1*c*), and the small black soybeans (1*d*) separated from the soaking liquids (1*a*-1, 1*b*-1, 1*c*-1, and 1*d*-1) at a ratio of 1:1 (w/w).

In this state, the first, second, third and fourth glass jars (10, 20, 30, and 40) containing the pre-soaked chickpeas (1*a*), yellow soybeans (1*b*), large black soybeans (1*c*), and small black soybeans (1*d*) and distilled water (B1) may be placed in a pressurizing/heating device (A2) for heating and pressurizing.

These first, second, third and fourth glass jars (10, 20, 30, and 40) may be heated at 118° C. while being pressurized by a pressurizing/heating device (A2) (for example, a pressure cooker).

At this time, the pre-soaked chickpeas (1*a*) may be cooked by heating for 30 minutes while being pressurized at 70 to 80 kPa by the pressurizing/heating device (A2), and the pre-soaked yellow soybeans (1*b*), large black soybeans (1*c*), and small black soybeans (1*d*) may be cooked by heating for 90 minutes while being pressurized to 70 to 80 kPa by the pressurizing/heating device (A2) (S5).

The chickpeas (1*a*), the yellow soybeans (1*b*), the large black soybeans (1*c*), and the small black soybeans (1*d*) cooked by heating can be cooled using a cooling device (A3) at 22° C. for 24 hours (S6).

The cooled chickpeas (1*a*), yellow soybeans (1*b*), large black soybeans (1*c*) and small black soybeans (1*d*), and soaking liquids (1*a*-2, 1*b*-2, 1*c*-2, and 1*d*-2) may be separated using a strainer (A1) (S7). For example, the soaking liquids (1*a*-2, 1*b*-2, 1*c*-2, and 1*d*-2) may be separated from the chickpeas (1*a*), the yellow soybeans (1*b*), the large black soybeans (1*c*), and the small black soybeans (1*d*) using a strainer (A1).

The soaking liquids (1*a*-2, 1*b*-2, 1*c*-2, and 1*d*-2) (for example, aquafaba, AQ) of the chickpeas (1*a*), the yellow soybeans (1*b*), the large black soybeans (1*c*), and the small black soybeans (1*d*) separated in this way may be vacuum dried for 48 hours in a dryer (A4) after complete freezing at −20° C. (S8).

When drying of the soaking liquids (1*a*-2, 1*b*-2, 1*c*-2, and 1*d*-2) (for example, aquafaba, AQ) of the chickpeas (1*a*), the yellow soybeans (1*b*), the large black soybeans (1*c*), and the small black soybeans (1*d*) is completed, the chickpea soaking liquid (AQ) powder (1*a*-3), yellow soybean soaking liquid (AQ) powder (1*b*-3), large Small black soybean soaking liquid (AQ) powder (1*c*-3), and Small black soybean soaking liquid (AQ) powder (1*d*-3) may be obtained from the soaking liquids (1*a*-2, 1*b*-2, 1*c*-2, and 1*d*-2) (for example, aquafaba, AQ) (S9).

In this way, the chickpeas (1*a*), the yellow soybeans (1*b*), the large black soybeans (1*c*), and the small black soybeans (1*d*), which are selected legumes (1), are washed with distilled water (B1), dried, and pre-soaked, the pre-soaked legumes (1) and soaking liquid are separated, the separated legumes are pressurized, heated, and cooled, and the cooled legumes (1) and the soaking liquid are separated, and the separated soaking liquid is dried to prepare chickpea soaking liquid (AQ) powder (1*a*-3), yellow soybean soaking liquid (AQ) powder (1*b*-3), large Small black soybean soaking liquid (AQ) powder (1*c*-3), and Small black soybean soaking liquid (AQ) powder (1*d*-3), and the chickpea soaking liquid (AQ) powder (1*a*-3), the yellow soybean soaking liquid (AQ) powder (1*b*-3), the large Small black soybean soaking liquid (AQ) powder (1*c*-3), and the Small black soybean soaking liquid (AQ) powder (1*d*-3) obtained through the processes may be used in or added to a variety of dishes such as porridge, soup, stew, rice cakes, vegetable pancakes, mung-bean pancakes, noodles, snacks, breads, soybean paste, makjang and red pepper paste and also used as plant-based meat, cultured meat, and artificial eggs to replace animal protein. Therefore, the chickpea soaking liquid (AQ) powder (1*a*-3), the yellow soybean soaking liquid (AQ) powder (1*b*-3), the large Small black soybean soaking liquid (AQ) powder (1*c*-3), and Small black soybean soaking liquid (AQ) powder (1*d*-3) may also be used as a meat substitute for vegetarians and users with allergies to animal proteins.

In various other embodiments of the present invention, the process of preparing legumes soaking liquid (AQ) powder through a pre-soaking non-treatment process of a preparation method of the legumes soaking liquid (AQ) powder will be described as follows.

Figure 3:
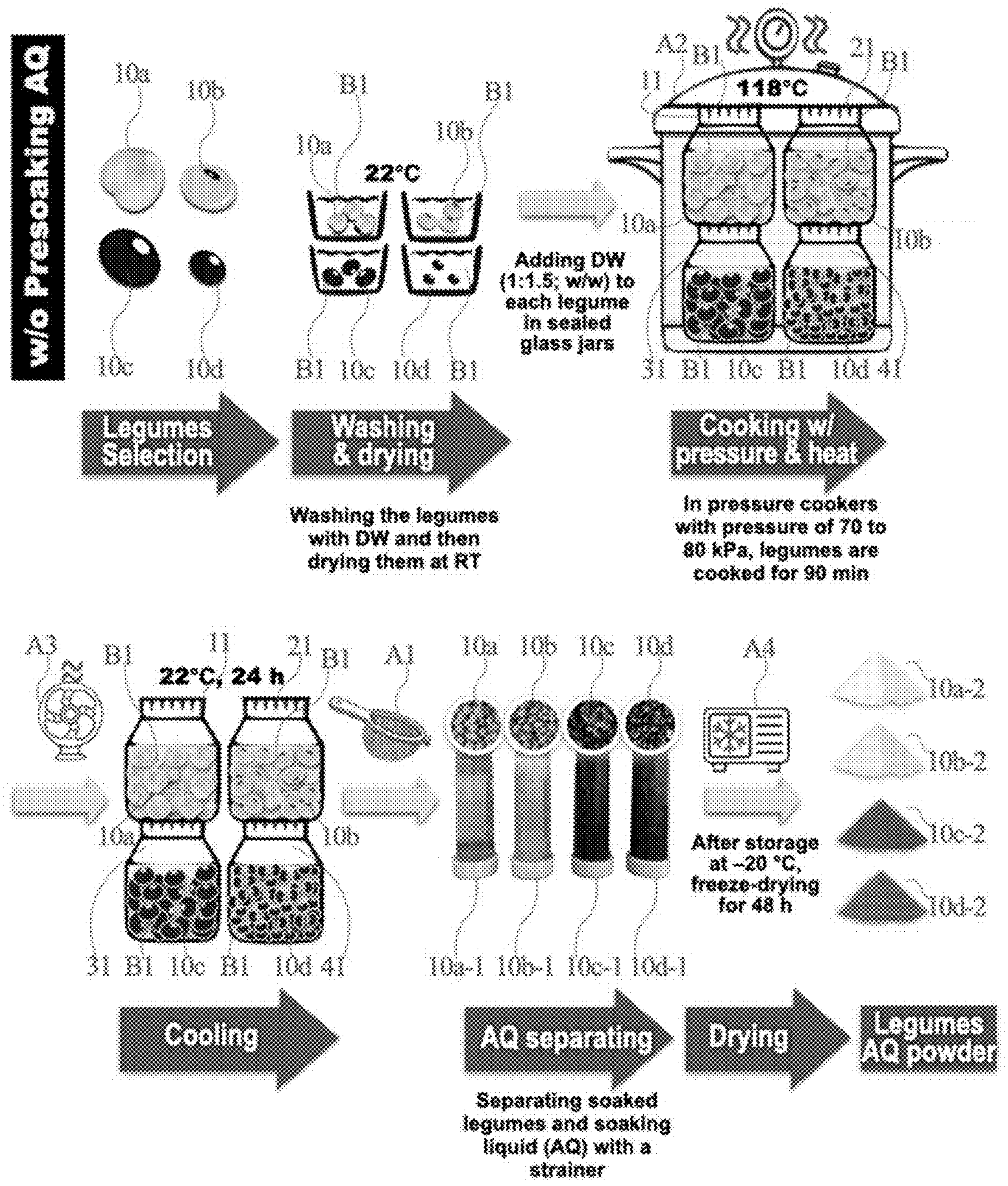
FIG. 3 is a drawing showing a pre-soaking non-treatment process in a method for preparing legumes powder known as aquafaba (for example, soaking liquid (AQ)) according to various other embodiments of the present invention.
Figure 4:
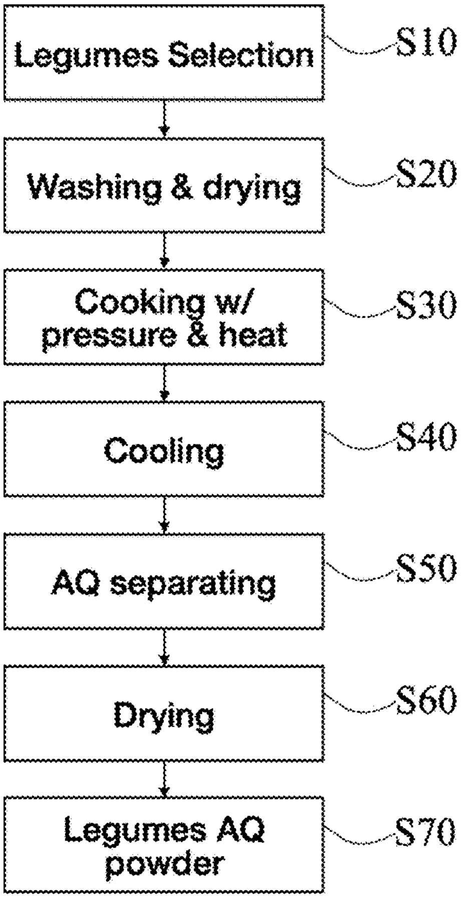
FIG. 4 is a flow chart showing a pre-soaking non-treatment process in a method for preparing legumes powder known as aquafaba (for example, soaking liquid (AQ)) according to various embodiments of the present invention.

FIG. 3 is a drawing showing a pre-soaking non-treatment process in a method of preparing legumes soaking liquid (AQ) powder according to various other embodiments of the present invention, and FIG. 4 is a flow chart showing a pre-soaking non-treatment process in a method of preparing legumes soaking liquid (AQ) powder according to various embodiments of the present invention.

Referring to FIGS. 3 and 4, in the method of preparing legumes soaking liquid (AQ) powder, first, legumes (10) may be selected. For example, the legumes (10) may include chickpeas (10*a*), yellow soybeans (10*b*), large black soybeans (10*c*), and small black soybeans (10*d*). In addition, the legumes (10) may include at least one of chickpeas (10*a*), yellow soybeans (10*b*), large black soybeans (10*c*), or small black soybeans (10*d*).

In this embodiment, the legumes (10) will be described by selecting chickpeas (10*a*), yellow soybeans (10*b*), large black soybeans (10*c*), and small black soybeans (10*d*) (S10).

The selected chickpeas (10*a*), yellow soybeans (10*b*), large black soybeans (10*c*) and small black soybeans (10*d*) may be washed with distilled water (B1) and then dried at room temperature of 22° C. (S20).

Next, the chickpeas (10*a*) may be placed in a first glass jar (11) and sealed, and the yellow soybeans (10*b*) may be placed in a second glass jar (21) and sealed. In addition, the large black soybeans (10*c*) may be placed in a third glass jar (31) and sealed, and the small black soybeans (10*d*) may be placed in a fourth glass jar (41) and sealed.

At this time, the chickpeas (10*a*) and distilled water (B1) may be contained in the first glass jar (11) at a 1:1.5 (w/w) ratio. Similarly, the yellow soybeans (10*b*), the large black soybeans (10*c*) and the small black soybeans and distilled water (B1) may be contained in each of the second, third and fourth glass jars (21, 31, and 41) at a 1:1.5 (w/w) ratio.

In this state, the first, second, third and fourth glass jars (11, 21, 31, and 41) containing the chickpeas (10*a*), the yellow soybeans (10*b*), the large black soybeans (10*c*), and the small black soybeans (10*d*) and distilled water (B1) may be placed in a pressurizing/heating device (A2) for pressurizing and heating.

The first, second, third and fourth glass jars (11, 21, 31, and 41) may be heated at 118° C. while pressurizing by a pressurizing/heating device (A2).

At this time, the chickpeas (10*a*) may be cooked by heating for 90 minutes while being pressurized to 70 to 80 kPa by the pressurizing/heating device (A2). Likewise, the yellow soybeans (10*b*), the large black soybeans (10*c*), and the small black soybeans (10*d*) may be cooked by heating for 90 minutes while being pressurized to 70 to 80 kPa by the pressurizing/heating device (A2) (S30).

The chickpeas (10*a*), the yellow soybeans (10*b*), the large black soybeans (10*c*), and the small black soybeans (10*d*) cooked by heating may be cooled using a cooling device (A3) at 22° C. for 24 hours (S40).

The cooled chickpeas (10*a*), yellow soybeans (10*b*), large black soybeans (10*c*) and small black soybeans (10*d*), and soaking liquids (10*a*-1, 10*b*-1, 10*c*-1, and 10*d*-1) (for example, aquafaba, AQ) may be separated using a strainer (A1) (S50).

The soaking liquids (10*a*-1, 10*b*-1, 10*c*-1, and 10*d*-1) (for example, aquafaba, AQ) of the separated chickpeas (10*a*), yellow soybeans (10*b*), large black soybeans (10*c*), and small black soybeans (10*d*) may be vacuum dried for 48 hours in a dryer (A4) after complete freezing at −20° C. (S60).

When drying of the soaking liquids (10*a*-1, 10*b*-1, 10*c*-1, and 10*d*-1) (for example, aquafaba, AQ) of the chickpeas (10*a*), the yellow soybeans (10*b*), the large black soybeans (10*c*), and the small black soybeans (10*d*) is completed, chickpea soaking liquid (AQ) powder (10*a*-2), yellow soybean soaking liquid (AQ) powder (10*b*-2), large Small black soybean soaking liquid (AQ) powder (10*c*-2), and Small black soybean soaking liquid (AQ) powder (10*d*-2) may be obtained from the soaking liquids (10*a*-1, 10*b*-1, 10*c*-1, and 10*d*-1) (S70).

In this way, the chickpeas (10*a*), the yellow soybeans (10*b*), the large black soybeans (10*c*), and the small black soybeans (10*d*), which are selected legumes (10), are washed with distilled water (B1), then dried, pressurized, heated, and cooled, and the cooled legumes (10) and the soaking liquid (for example, aquafaba, AQ) are separated, and the separated soaking liquid (for example, aquafaba, AQ) is dried to prepare chickpea soaking liquid (AQ) powder (10*a*-2), yellow soybean soaking liquid (AQ) powder (10*b*-2), large Small black soybean soaking liquid (AQ) powder (10*c*-2), and Small black soybean soaking liquid (AQ) powder (10*d*-2), and the chickpea soaking liquid (AQ) powder (10*a*-2), the yellow soybean soaking liquid (AQ) powder (10*b*-2), the large Small black soybean soaking liquid (AQ) powder (10*c*-2), and the Small black soybean soaking liquid (AQ) powder (10*d*-2) obtained through the processes may be used in a variety of vegan dishes and used as plant-based meat, cultured meat, and artificial eggs to replace animal protein. Therefore, the chickpea soaking liquid (AQ) powder (10*a*-2), yellow soybean soaking liquid (AQ) powder (10*b*-2), large Small black soybean soaking liquid (AQ) powder (10*c*-2), and Small black soybean soaking liquid (AQ) powder (10*d*-2) may also be used as a meat substitute for vegetarians and users with allergies to animal proteins.

According to various embodiments, legumes soaking liquids (AQ) (for example, chickpea soaking liquid (1*a*-2), yellow soybean soaking liquid (1*b*-2), large Small black soybean soaking liquid (1*c*-2), and Small black soybean soaking liquid (1*d*-2)), which are produced by pre-soaking the legumes (1) in water before cooking, may achieve excellent performance in both analyses of foaming ability and emulsifying ability compared to legumes soaking liquids (for example, chickpea soaking liquid (10*a*-1), yellow soybean soaking liquid (10*b*-1), large Small black soybean soaking liquid (10*c*-1), and Small black soybean soaking liquid (10*d*-1)) produced through pre-soaking non-treatment of the legumes (10). In particular, the soaking liquid (1*a*-2) prepared from chickpeas (1*a*) used in pre-soaking was able to show superior emulsifying ability compared to other soybean soaking liquids, but the soaking liquid (for example, aquafaba) of other soybean samples showed emulsification stability of 80% or more. In addition, the soybean soaking liquids (yellow soybean soaking liquid (1*b*-2), large Small black soybean soaking liquid (1*c*-2), and Small black soybean soaking liquid (1*d*-2)) used in the pre-soaking showed excellent foaming ability compared to foreign chickpea soaking liquid (1*a*-2) from Canada, known as the control for aquafaba.

Figure 5:
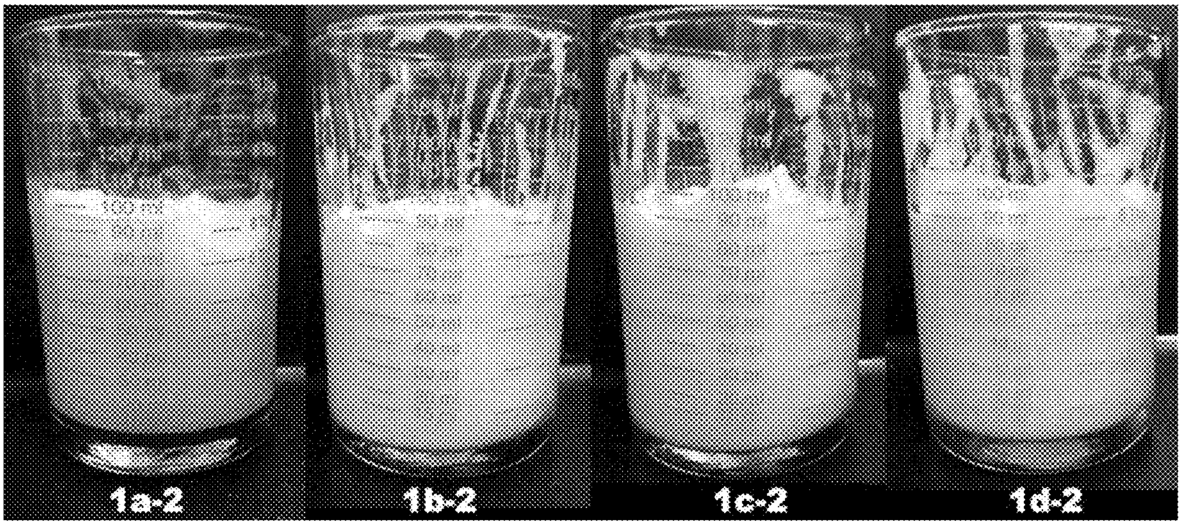
FIG. 5 is a drawing showing aquafaba (for example, soaking liquid (AQ)) whipped with a hand mixer after a pre-soaking process in a method for preparing legumes powder according to various embodiments of the present invention.

As shown in FIG. 5, the chickpea soaking liquid (1*a*-2), the yellow soybean soaking liquid (1*b*-2), the large Small black soybean soaking liquid (1*c*-2), and the Small black soybean soaking liquid (1*d*-2) separated using a strainer after pre-soaking may be whipped for 2 minutes using a hand mixer (for example, a whisk). The white of one egg may be replaced with about 30 mL of the whipped chickpea soaking liquid (1*a*-2), yellow soybean soaking liquid (1*b*-2), large Small black soybean soaking liquid (1*c*-2), and Small black soybean soaking liquid (1*d*-2).

As such, the legumes soaking liquid (AQ) powder (chickpea powder (1*a*-3), yellow soybean powder (1*b*-3), large Small black soybeanpowder (1*c*-3), and Small black soybean powder (1*d*-3)) respectively prepared using the legumes chickpeas (1*a*), yellow soybeans (1*b*), large black soybeans (1*c*), and small black soybeans (1*d*) is expected to be used to develop new high-value functional foods made from legumes with added flavor and nutrition to counter the nutritional imbalance in vegan food, which is expected to help recover food resources and prevent environmental pollution.

For example, the soaking liquid (for example, aquafaba), which is a legumes liquid in which the legumes are boiled, is a highly nutritious, high-protein, water-soluble by-product in which various bioactive components of raw legumes have been eluted, and its potential for recycling as a food material is currently attracting attention as an upcycled food. It is believed that this will help recover food resources and prevent environmental pollution instead of discarding the soaking liquid. In addition, legumes cooking water (for example, aquafaba, AQ), which is a soaking liquid (for example, waste liquid), shows great potential as a cost-effective substitute for eggs in vegan cuisine, confectioneries and baking. For example, legumes powder produced through this soaking liquid (for example, aquafaba, AQ) may be provided as an egg substitute for vegetarians. Therefore, we can expect the expansion of the development of highly useful vegetable raw material foods along with meat substitutes.

For example, currently, soybeans (examples of soybeans: yellow soybeans (1*b*), large black soybeans (1*c*), and small black soybeans (1*d*)), which are attracting attention as a meat substitute in the vegan market, include not only high-quality protein but also various biologically active substances such as isoflavones, saponins, plant sterols, and peptides, and some of these compounds help relieve symptoms of hypocholesterolemia, atherosclerosis, lowering the risk of cancer, high blood pressure, and osteoporosis, as well as menopausal symptoms. Despite the efficacy of soybeans, soybeans in the Asian diet are limited to tofu and soy sauce and soybean paste made by fermenting soybeans. Therefore, it is advantageous to develop and distribute products that utilize the excellent components of soybeans in a more diverse manner.

The method of preparing legumes soaking liquid (AQ) powder of various embodiments of the present invention described above is not limited to the above-described examples and drawings, and it will be clear to those skilled in the art that various substitutions, modifications and changes are possible within the technical scope of the present invention.

DESCRIPTION OF MARKS IN THE FIGURES

1, 10: Legumes
1*a*, 10*a*: Chickpeas (CDC Leader)
1*b*, 10*b*: Yellow soybeans (Backtae)
1*c*, 10*c*: Large black soybeans (Seoritae)
1*d*, 10*d*: Small black soybeans (Jwinunikong)
10, 11: First glass jar
20, 21: Second glass jar
30, 31: Third glass jar
40, 41: Fourth glass jar
1*a*-1: Chickpea pre-soaking liquid
1*b*-1: Yellow soybean pre-soaking liquid
1*c*-1: Large Small black soybean soaking liquid
1*d*-1: Small black soybean soaking liquid
1*a*-2, 10*a*-1: Chickpea soaking liquid (AQ)
1*b*-2, 10*b*-1: Yellow soybean soaking liquid (AQ)
1*c*-2, 10*c*-1: Large Small black soybean soaking liquid (AQ)
1*d*-2, 10*d*-1: Small black soybean soaking liquid (AQ)
1*a*-3, 10*a*-2: Chickpea soaking liquid (AQ) powder
1*b*-3, 10*b*-2: Yellow soybean soaking liquid (AQ) powder
1*c*-3, 10*c*-2: Large Small black soybean soaking liquid (AQ) powder
1*d*-3, 10*d*-2: Small black soybean soaking liquid (AQ) powder A1: Strainer
A2: Pressurizing/heating device
A3: Cooling device
A4: Dryer
B1: Distilled water (DW)

What is claimed is:

1. A method for preparing aquafaba powder for edible emulsifier, comprising:

selecting legumes, wherein the legumes are soybeans;

washing the selected soybeans with distilled water and then drying the soybeans at room temperature of 22° C.;

soaking the soybeans in distilled water at 4° C. for 16 hours, wherein the soybeans are added along with distilled water in a glass jar at a ratio of 1:3 and sealed;

separating the soaked soybeans and soaking liquid using a strainer;

heating the separated soybeans at 118° C. while being pressurized by a pressurizing/heating device to obtain soybeans and aquafaba;

cooling the obtained soybeans and aquafaba at 22° C. for 24 hours;

separating the cooled soybeans and the aquafaba after the cooling process using a strainer; and obtaining aquafaba powder by freezing the separated aquafaba at −20° C. and then vacuum drying the frozen aquafaba in a dryer for 48 hours, wherein the separated soaked soybeans are cooked by heating for 90 minutes at 118° C. while being pressurized to 70 to 80 kPa by the pressurizing/heating device.

2. A method for preparing aquafaba powder for edible emulsifier, comprising:

a process of selecting legumes, wherein the legumes are soybeans;

a process of washing the selected soybeans with distilled water and then drying the soybeans at room temperature of 22° C.;

a process of mixing the dried soybeans and distilled water at a 1:1.5 ratio (w/w);

a process of heating the mixture of the dried legumes and distilled watersoybeans at 118° C. for 90 minutes while being pressurized to 70 to 80 kPa by a pressurizing/heating device to obtain soybeans and aquafaba;

a process of cooling the obtained soybeans and aquafaba at 22° C. for 24 hours;

a process of separating the cooled soybeans and aquafaba generated after the cooling process using a strainer; and a process of obtaining aquafaba powder after freezing the separated aquafaba at −20° C. and vacuum drying the frozen aquafaba in a dryer for 48 hours.

* * * * *